United States Patent
Shin et al.

(10) Patent No.: US 11,548,996 B2
(45) Date of Patent: *Jan. 10, 2023

(54) POLYESTER FILM AND METHOD FOR REPRODUCING POLYESTER CONTAINER USING SAME

(71) Applicants: SKC CO., LTD., Gyeonggi-do (KR); SKC INC., Covington, GA (US)

(72) Inventors: Dae Yong Shin, Gyeonggi-do (KR); Yong Deuk Kim, Jeollanam-do (KR); Jung Kyu Lee, Seoul (KR); Jaehyong Son, Snellville, GA (US); Eugene Jung, Lawrenceville, GA (US); Chul Kyu Kim, Gyeonggi-do (KR); Joo Ho Yang, Seoul (KR)

(73) Assignees: SKC CO., LTD., Gyeonggi-do (KR); SKC INC., Covington, GA (US)

( * ) Notice: Subject to any disclaimer, the term of this patent is extended or adjusted under 35 U.S.C. 154(b) by 127 days.

This patent is subject to a terminal disclaimer.

(21) Appl. No.: 16/614,720

(22) PCT Filed: Apr. 30, 2019

(86) PCT No.: PCT/KR2019/005232
§ 371 (c)(1),
(2) Date: Nov. 18, 2019

(87) PCT Pub. No.: WO2019/212241
PCT Pub. Date: Nov. 7, 2019

(65) Prior Publication Data
US 2021/0054140 A1   Feb. 25, 2021

Related U.S. Application Data

(60) Provisional application No. 62/664,543, filed on Apr. 30, 2018.

(30) Foreign Application Priority Data

Mar. 15, 2019 (KR) .................. 10-2019-0030153
Mar. 15, 2019 (KR) .................. 10-2019-0030165

(51) Int. Cl.
*C08G 63/183* (2006.01)
*C08J 11/12* (2006.01)
(Continued)

(52) U.S. Cl.
CPC ............. *C08J 11/12* (2013.01); *B29B 9/04* (2013.01); *B29B 17/04* (2013.01); *B29C 61/02* (2013.01);
(Continued)

(58) Field of Classification Search
CPC .. C08G 63/199; C08G 63/183; C08G 63/672; C08G 2390/00; C08J 11/12; C08J 5/18;
(Continued)

(56) References Cited

U.S. PATENT DOCUMENTS 4,985,538 A   1/1991   Fukuda et al.
5,968,666 A   10/1999  Carter et al.
(Continued)

FOREIGN PATENT DOCUMENTS

CA   2912355 A1   11/2014
CN   1213340 A    4/1999
(Continued)

OTHER PUBLICATIONS

Office Action issued by the USPTO for U.S. Appl. No. 16/355,519 dated Jun. 9, 2020.
(Continued)

*Primary Examiner* — Monica A Huson
(74) *Attorney, Agent, or Firm* — IP & T Group LLP (57) ABSTRACT

The embodiments relate to a polyester film, which comprises a copolymerized polyester resin comprising a diol
(Continued)

```
Preparing a polyester container provided with a polyester film        (1)
                              ↓
Crushing the polyester container provided with the film to obtain flakes   (2)
                              ↓
Thermally treating the flakes to produce regenerated polyester chips   (3)
``` component and a dicarboxylic acid component and has a heat shrinkage rate of 30% or more in the main shrinkage direction upon thermal treatment at a temperature of 80° C. for 10 seconds and a melting point of 170° C. or higher as measured by differential scanning calorimetry, which not only solve the environmental problems by improving the recyclability of the polyester container, but also are capable of enhancing the yield and productivity, and a process for regenerating a polyester container using the same.

20 Claims, 1 Drawing Sheet (51) Int. Cl.
  *C08J 5/18*   (2006.01)
  *C08G 63/672*   (2006.01)
  *B29B 9/04*   (2006.01)
  *B29B 17/04*   (2006.01)
  *B29C 61/02*   (2006.01)
  *B29L 9/00*   (2006.01)

(52) U.S. Cl.
  CPC ......... *C08G 63/183* (2013.01); *C08G 63/672* (2013.01); *C08J 5/18* (2013.01); *B29L 2009/00* (2013.01); *C08G 2390/00* (2013.01); *C08J 2367/02* (2013.01); *C08J 2367/03* (2013.01)

(58) Field of Classification Search
  CPC ... C08J 2367/02; C08J 2367/03; B29B 17/04; B29B 17/00; B29B 9/04; C08L 67/02; B29L 2009/00
  See application file for complete search history.

(56) References Cited

U.S. PATENT DOCUMENTS

| | | | |
|---|---|---|---|
| 6,342,281 | B2 | 1/2002 | Hayakawa et al. |
| 6,663,929 | B1 | 12/2003 | Tabota et al. |
| 7,074,467 | B2 | 7/2006 | Kim et al. |
| 7,128,863 | B2 | 10/2006 | Kim et al. |
| 10,800,897 | B2 * | 10/2020 | Shin .......................... C08J 11/12 |
| 11,008,434 | B2 * | 5/2021 | Shin .......................... B29B 9/04 |
| 2005/0196563 | A1 | 9/2005 | Ito et al. |
| 2009/0227735 | A1 | 9/2009 | Shih et al. |
| 2011/0224369 | A1 | 9/2011 | Kim et al. |
| 2013/0274434 | A1 | 10/2013 | Kim et al. |
| 2014/0162042 | A1 | 6/2014 | Shih et al. |
| 2018/0079877 | A1 | 3/2018 | Ishimaru et al. |
| 2019/0330441 | A1 | 10/2019 | Shin et al. |
| 2019/0375552 | A1 | 12/2019 | Haruta et al. |
| 2021/0108027 | A1 | 4/2021 | Minami et al. |

FOREIGN PATENT DOCUMENTS

| | | |
|---|---|---|
| EP | 1418042 A1 | 5/2004 |
| EP | 1424188 A1 | 6/2004 |
| EP | 1872935 A1 | 1/2008 |
| EP | 2631261 A2 | 8/2013 |
| EP | 3012286 A2 | 4/2016 |
| JP | H6-155574 A | 6/1994 |
| JP | 2001-058622 | 3/2001 |
| JP | 2002-088172 A | 3/2002 |
| JP | 2003-122256 | 4/2003 |
| JP | 2004-169005 A | 6/2004 |
| JP | 2005-002197 A | 1/2005 |
| JP | 2006-264136 A | 10/2006 |
| JP | 2010-058366 A | 3/2010 |
| JP | 2013-209246 A | 10/2013 |
| JP | 2014-065282 | 4/2014 |
| KR | 10-2002-0049872 | 6/2002 |
| KR | 10-2007-0007058 | 1/2007 |
| KR | 10-0688347 | 3/2007 |
| KR | 10-0981129 | 9/2010 |
| TW | 201139531 A1 | 11/2011 |
| TW | 201217429 A | 5/2012 |
| TW | 201835150 A | 10/2018 |
| TW | 201900720 A | 1/2019 |
| WO | 0112697 A1 | 2/2001 |
| WO | 2016199809 A1 | 12/2016 |

OTHER PUBLICATIONS

Patent Examination Report issued in corresponding New Zealand Patent Application No. 756694, dated Jul. 14, 2021, 8 pages, by the New Zealand Intellectual Property Office.
Office Action issued by the Australian Patent Office dated Dec. 6, 2019.
Office Action issued the Indian Patent Office dated Mar. 23, 2021.
International Search Report Issued by PCT International Application No. PCT/KR2019/005232 dated Aug. 2, 2019.
Supplementary European Search Report issued by European Patent Office dated Nov. 18, 2020.
Office Action issued by Japanese Patent Office dated Sep. 23, 2020.
Sleeve Label Ink and Substrate for PET Bottles Critical Guidance Document, Nov. 2, 2012, pp. 1-19, Association of Postconsumer Plastic Recyclers.
Invalidation Action for the Taiwanese Patent No. 1720541 (Application No. 108124728) issued by the Taiwanese Patent Office dated Oct. 5, 2022.
Akihiko Toda, Heating rate dependence of melting peak temperature examined by DSC of heat flux type, Journal of Thermal Analysis and Calorimetry, vol. 123, No. 3, Mar. 28, 2015, pp. 1795-1808, Springer.
Office Action for the European Patent Application No. 21188707.0 issued by the European Patent Office dated Oct. 19, 2022.

* cited by examiner

POLYESTER FILM AND METHOD FOR REPRODUCING POLYESTER CONTAINER USING SAME

CROSS-REFERENCE TO RELATED APPLICATION

This application is a national stage application of PCT/KR2019/005232 filed on Apr. 30, 2019, which claims the benefit of U.S. Provisional Patent Application No. 62/664,543 filed Apr. 30, 2018, which claims priority of Korean patent application number 10-2019-0030153 and Korean patent application number 10-2019-0030165 filed on Mar. 15, 2019. The disclosure of each of the foregoing applications is incorporated herein by reference in its entirety.

TECHNICAL FIELD

Embodiments relate to a polyester film and a process for regenerating a polyester container using the same, which not only solve the environmental problems by improving the recyclability of the polyester container, but also are capable of enhancing the yield and productivity.

BACKGROUND ART

As concerns about environmental problems have increased in recent years, there is a demand for addressing the recycling issues of products fabricated using thermoplastic polymers. In particular, polyethylene terephthalate, a thermoplastic resin having excellent properties in terms of thermal resistivity, processability, transparency, and non-toxicity, has been widely used for producing a wide range of products such as films, fibers, bottles, containers, and the like, and efforts have been made to improve the regeneration rate thereof.

In general, a polyolefin stretch film or the like is attached to a container produced from polyethylene terephthalate as a label. Thus, once a container recycled from the consumers has been washed and crushed, it is then subjected to liquid specific gravity separation, dehydration, drying, and/or wind specific gravity separation in order to remove a large amount of films contained in the crushed product and then to such an additional step as pelletization to obtain regenerated polyester chips. However, there has been a disadvantage in that the films are not completely removed even after the above steps; and that the regenerated polyester chips are colored due to the inks contained in the films, or they are non-uniformly clumped during the thermal treatment thereof.

Accordingly, a method of using a film made of a low specific gravity polymer such as polystyrene, polyethylene, polypropylene, and the like as a label has been proposed in order to readily carry out the specific gravity separation. However, the low specific gravity thereof cannot be effectively achieved due to the ink layer, which makes it difficult to completely separate the films, and the problem that the residual ink colors the regenerated chips cannot be solved.

DISCLOSURE OF INVENTION

Technical Problem

Accordingly, embodiments aim to provide a polyester film capable of preventing the clumping caused by residual ink during the regeneration process, thereby improving the recyclability of a polyester container, and a process for regenerating a polyester container using the same.

Solution to Problem

According to an embodiment, there is provided a polyester film, which comprises a copolymerized polyester resin comprising a diol component and a dicarboxylic acid component and has a heat shrinkage rate of 30% or more in the main shrinkage direction upon thermal treatment at a temperature of 80° C. for 10 seconds and a melting point of 170° C. or higher as measured by differential scanning calorimetry.

According to an embodiment, there is provided a polyester film, which comprises a copolymerized polyester resin comprising a diol component and a dicarboxylic acid component and has a haze of 50% or less when immersed in a 1% aqueous solution of NaOH for 15 minutes.

According to an embodiment, there is provided a polyester film, which comprises a first layer comprising a copolymerized polyester resin comprising a diol component and a dicarboxylic acid component and a second layer comprising a resin having a glass transition temperature (Tg) of 70° C. or higher.

According to an embodiment, there is provided a process for regenerating a polyester container, which comprises preparing the polyester container provided with the polyester film; crushing the container provided with the polyester film to obtain flakes; and thermally treating the flakes to produce regenerated polyester chips, wherein when the flakes are thermally treated at a temperature of 200° C. to 220° C. for 60 minutes to 120 minutes, the clumping fraction is 8% or less, and the flakes comprise first flakes obtained by crushing the container and second flakes obtained by crushing the polyester film.

Advantageous Effects of Invention

The polyester film according to the embodiments improves the recyclability of a polyester container, thereby solving the environmental problems, and enhances the yield and productivity.

In addition, the process for regenerating a polyester container according to the embodiment does not require a separate step of separating the polyester container and a film, thereby saving time and cost.

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions relating to quantities of components, reaction conditions, and the like used herein are to be understood as being modified by the term "about" unless specifically stated otherwise.

Polyester Film

According to an embodiment, there is provided a polyester film, which comprises a copolymerized polyester resin comprising a diol component and a dicarboxylic acid component and has a heat shrinkage rate of 30% or more in the main shrinkage direction upon thermal treatment at a temperature of 80° C. for 10 seconds and a melting point of 170° C. or higher as measured by differential scanning calorimetry.

According to an embodiment, there is provided a polyester film, which comprises a copolymerized polyester resin comprising a diol component and a dicarboxylic acid component, wherein the heat shrinkage rate of the film is 30% or more in the main shrinkage direction upon thermal treatment at a temperature of 80° C. for 10 seconds, and the crystallization temperature of the film is not measured or is 70° C. to 95° C. by differential scanning calorimetry.

According to an embodiment, the copolymerized polyester resin comprises a diol component and a dicarboxylic acid component.

According to an embodiment, the diol component is composed of a linear or branched $C_2$ to $C_{10}$ diol. That is, the diol component may not comprise an alicyclic diol or an aromatic diol.

For example, the linear or branched $C_2$ to $C_{10}$ diol may comprise a derivative of ethylene glycol, diethylene glycol, neopentyl glycol, 1,3-propanediol, 1,2-octanediol, 1,3-octanediol, 2,3-butanediol, 1,3-butanediol, 1,4-butanediol, 1,5-pentanediol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, 1,6-hexanediol, 2-ethyl-3-methyl-1,5-hexanediol, 2-ethyl-3-ethyl-1,5-hexanediol, 1,7-heptanediol, 2-ethyl-3-methyl-1,5-heptanediol, 2-ethyl-3-ethyl-1,6-heptanediol, 1,8-octanediol, 1,9-nonanediol, 1,10-decanediol, or any combination thereof. But it is not limited thereto.

According to an embodiment, the diol component may comprise at least one selected from the group consisting of ethylene glycol, diethylene glycol, cyclohexanedimethanol (CHDM), propanediol unsubstituted or substituted with an alkyl group, butanediol unsubstituted or substituted with an alkyl group, pentanediol unsubstituted or substituted with an alkyl group, hexanediol unsubstituted or substituted with an alkyl group, octanediol unsubstituted or substituted with an alkyl group, and a combination thereof.

According to an embodiment, the diol component may comprise ethylene glycol, diethylene glycol, 1,4-cyclohexanedimethanol, 1,3-propanediol, 1,2-octanediol, 1,3-octanediol, 2,3-butanediol, 1,3-butanediol, 1,4-butanediol, 1,5-pentanediol, neopentyl glycol, 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, or a combination thereof.

According to an embodiment, the diol component may be at least one selected from the group consisting of ethylene glycol, diethylene glycol, neopentyl glycol, and cyclohexanedimethanol.

The dicarboxylic acid component may be selected from the group consisting of an aromatic dicarboxylic acid such as terephthalic acid, dimethylterephthalic acid, isophthalic acid, naphthalene dicarboxylic acid, orthophthalic acid, and the like; an aliphatic dicarboxylic acid such as adipic acid, azelaic acid, sebacic acid, decanedicarboxylic acid, and the like; an alicyclic dicarboxylic acid; an ester thereof; and a combination thereof. Specifically, the dicarboxylic acid component may be composed of terephthalic acid, dimethylterephthalic acid, isophthalic acid, naphthalene dicarboxylic acid, orthophthalic acid, or a combination thereof.

According to an embodiment, the dicarboxylic acid component may comprise an aromatic dicarboxylic acid. For example, the dicarboxylic acid component may comprise at least 80% by mole, at least 90% by mole, or at least 95% by mole of terephthalic acid, dimethyl terephthalic acid, or isophthalic acid, based on the total number of moles of the dicarboxylic acid component.

According to an embodiment, the copolymerized polyester resin may comprise ethylene glycol in an amount of 55 to 94% by mole based on the total number of moles of the diol component. For example, the copolymerized polyester resin may comprise ethylene glycol in an amount of 60 to 90% by mole, 65 to 85% by mole, or 65 to 80% by mole, based on the total number of moles of the diol component. If the above range is satisfied, the heat shrinkage rate of a film thus prepared can be adjusted to a proper level, and the clumping fraction in the subsequent regeneration step can be reduced.

According to an embodiment, the copolymerized polyester resin may comprise diethylene glycol in an amount of 1 to 20% by mole based on the total number of moles of the diol component. For example, the copolymerized polyester resin may comprise diethylene glycol in an amount of 1 to 15% by mole, 1 to 13% by mole, 1 to 10% by mole, 1.5 to 10% by mole, or 1 to 8% by mole, based on the total number of moles of the diol component. If the above range is satisfied, the heat shrinkage rate of a film thus prepared can be adjusted to a proper level, and the clumping fraction in the subsequent regeneration step can be reduced.

According to an embodiment, the copolymerized polyester resin may comprise neopentyl glycol in an amount of 5 to 35% by mole based on the total number of moles of the diol component. For example, the copolymerized polyester resin may comprise neopentyl glycol in an amount of 5 to 30% by mole, 7 to 35% by mole, 10 to 30% by mole, or 15 to 30% by mole, based on the total number of moles of the diol component. If the above range is satisfied, a polyester film having a heat shrinkage rates in a first direction and in a direction perpendicular to the first direction that are not high even at a high temperature can be prepared. In particular, if the content of neopentyl glycol exceeds the above range, the film may excessively expand in the second direction as compared with the first direction, so that wrinkles or deformation may occur when the film is applied to a container. In addition, if the content of neopentyl glycol is less than the above range, the amorphous region is unnecessarily large, whereby the expansion coefficient would be increased due to the low shrinkage characteristics in the second direction although the shrinkage characteristics in the first direction could be improved.

In this specification, the first direction is the main shrinkage direction and may be the transverse direction or the longitudinal direction. Specifically, the first direction may be the transverse direction, and the second direction that is perpendicular to the first direction may be the longitudinal direction. Alternatively, the first direction may be the longitudinal direction, and the second direction that is perpendicular to the first direction may be the transverse direction.

According to an embodiment, the copolymerized polyester resin may comprise cyclohexanedimethanol in an amount of 0 to 35% by mole based on the total number of moles of the diol component. For example, the copolymerized polyester resin may comprise cyclohexanedimethanol in an amount of 1 to 35% by mole, 5 to 30% by mole, 7 to 30% by mole, 10 to 30% by mole, or 15 to 30% by mole, based on the total number of moles of the diol component. If the above range is satisfied, the heat shrinkage rate of a film thus prepared can be adjusted to a proper level, and the clumping fraction in the subsequent regeneration step can be reduced.

According to an embodiment, the copolymerized polyester resin comprises a dicarboxylic acid component and a diol component, wherein the dicarboxylic acid component may be composed of terephthalic acid, isophthalic acid, or dimethyl terephthalic acid, and the diol component may be composed of (i) neopentyl glycol and (ii) ethylene glycol, diethylene glycol, cyclohexanedimethanol, or a combination thereof. Specifically, the dicarboxylic acid component may be composed of terephthalic acid or dimethyl terephthalic acid, and the diol component may be composed of (i) neopentyl glycol and (ii) ethylene glycol. Alternatively, the dicarboxylic acid component may be composed of terephthalic acid, isophthalic acid, or dimethyl terephthalic acid, and the diol component may be composed of (i) diethylene glycol and (ii) ethylene glycol.

If the dicarboxylic acid component in the copolymerized polyester resin is composed of a terephthalic acid, isophthalic acid, or dimethyl terephthalic acid, and if the diol component therein is composed of (i) neopentyl glycol and (ii) ethylene glycol, diethylene glycol, or a combination thereof, the copolymerized polyester resin may have a reduced whitening phenomenon and a low haze of 15% or less and is excellent in dimensional stability.

The diol component may further comprise a monohydric alcohol. For example, it may further comprise isopropyl alcohol. Specifically, the copolymerized polyester resin may comprise a monohydric alcohol in an amount of 15 to 30% by mole, 18 to 25% by mole, or 20 to 25% by mole, based on the total number of moles of the diol component. But it is not limited thereto.

The dicarboxylic acid component and the diol component as described above are subjected to a transesterification reaction and then polymerization to thereby form a copolymerized polyester resin. Specifically, at least one catalyst selected from manganese acetate, calcium acetate, and zinc acetate may be used as a catalyst for the transesterification reaction. The content of the catalyst may be 0.02 to 0.2% by weight based on the total weight of the dicarboxylic acid compound. Upon completion of the transesterification reaction, at least one additive selected from silica, potassium, and magnesium; a stabilizer such as trimethyl phosphate; a polymerization catalyst selected from antimony trioxide and tetrabutylene titanate; and the like may be selectively added to carry out the reaction, to thereby prepare a copolymerized polyester resin composition.

According to an embodiment, the polyester film may have a heat shrinkage rate of 30% or more in the first direction upon thermal treatment at a temperature of 80° C. for 10 seconds. For example, the polyester film may have a heat shrinkage rate of 40% or more, 45% or more, 50% or more, 30% to 85%, 40% to 80%, or 50% to 80%, in the first direction upon thermal treatment at a temperature of 80° C. for 10 seconds. If the above range is satisfied, it is easy to attach and label the polyester film on the surface of a container.

According to an embodiment, the polyester film may have a heat shrinkage rate of 50% or more in the first direction upon thermal treatment at a temperature of 90° C. for 10 seconds. For example, the polyester film may have a heat shrinkage rate of 55% or more, 60% or more, 70% or more, 50% to 90%, 60% to 85%, 70% to 85%, or 70% to 80%, in the first direction upon thermal treatment at a temperature of 90° C. for 10 seconds. If the above range is satisfied, it is easy to attach and label the polyester film on the surface of a container.

According to an embodiment, the polyester film may have a heat shrinkage rate of 5% to 55% in the first direction upon thermal treatment at a temperature of 70° C. for 10 seconds. For example, the polyester film may have a heat shrinkage rate of 5% to 50%, 10% to 50%, 20% to 45%, or 25% to 40%, in the first direction upon thermal treatment at a temperature of 70° C. for 10 seconds. If the above range is satisfied, it is easy to attach and label the polyester film on the surface of a container.

According to an embodiment, the polyester film may have a heat shrinkage rate of 30% or more in the first direction upon thermal treatment at a temperature of 100° C. for 10 seconds. For example, the polyester film may have a heat shrinkage rate of 35% or more, 40% or more, 50% or more, 30% to 90%, 30% to 80%, 40% to 80%, 45% to 80%, or 50% to 80%, in the first direction upon thermal treatment at a temperature of 100° C. for 10 seconds. If the above range is satisfied, it is easy to attach and label the polyester film on the surface of a container.

According to an embodiment, the rate of increase in the heat shrinkage rate in the first direction in the temperature range of $0.35 \times Tm$° C. to $0.40 \times Tm$° C. is 2.5/° C. to 4.0%/° C., and the rate of increase in the heat shrinkage rate in the first direction in the temperature range of $0.45 \times Tm$° C. to $0.50 \times Tm$° C. is 0.1%/° C. to 1.0%/°×C.

According to an embodiment, the polyester film has a melting point (Tm) of 170° C. or higher as measured by differential scanning calorimetry. For example, the polyester film may have a melting point of 175° C. or higher, 170° C. or higher, specifically 170° C. to 230° C., 170° C. to 200° C., or 175° C. to 200° C., as measured by differential scanning calorimetry. If the above range is satisfied, the clumping fraction in the subsequent regeneration step can be reduced.

According to an embodiment, the crystallization temperature of the polyester film is not measured or is 70° C. to 95° C. by differential scanning calorimetry. For example, the crystallization temperature of the polyester film may be 70° C. to 93° C., 75° C. to 93° C., or 75° C. to 90° C. by differential scanning calorimetry. If the above range is satisfied, the clumping fraction in the subsequent regeneration step can be reduced.

According to an embodiment, the heat of crystallization of the polyester film may be 0.01 to 50 J/g as measured at the crystallization temperature (Tc). For example, the heat of crystallization of the polyester film may be 0.01 to 40 J/g, 0.05 to 30 J/g, 0.1 to 20 J/g, 0.1 to 10 J/g, 0.1 to 8 J/g, or 0.1 to 5 J/g, as measured at the crystallization temperature (Tc). If the above range is satisfied, the clumping fraction in the subsequent regeneration step can be reduced.

According to an embodiment, the polyester film has a glass transition temperature (Tg) of 60° C. or higher as measured by differential scanning calorimetry. For example, the polyester film may have a glass transition temperature of 65° C. or higher, 68° C. or higher, 70° C. or higher, 60° C. to 150° C., 65° C. to 150° C., 69° C. to 150° C., 70° C. to 120° C., or 65° C. to 80° C., as measured by differential scanning calorimetry. If the above range is satisfied, the clumping fraction in the subsequent regeneration step can be reduced.

According to an embodiment, the polyester film may have a haze of 10% or less. For example, the polyester film may have a haze of 8% or less, 7% or less, or 5% or less.

According to an embodiment, the polyester film may have a haze of 50% or less when immersed in a 0.5% to 3% aqueous solution of NaOH for 5 minutes to 30 minutes. More specifically, the polyester film may have a haze of 10% or less, 7% or less, 5% or less, 30% to 50%, 35% to 45%, or 40% to 45%, when immersed in a 1% aqueous solution of NaOH for 15 minutes. For example, the polyester film may have a haze of 9% or less, 7% or less, 5% or less, 30% to 50%, 35% to 45%, or 40% to 45%, when immersed in a 0.5% to 2.5% or 0.5% to 2% aqueous solution of NaOH for 5 minutes to 20 minutes or 10 minutes to 15 minutes at a temperature of 70° C. to 90° C., 75° C. to 90° C., or 85° C. If the above range is satisfied, the clumping fraction in the subsequent regeneration step can be reduced.

According to an embodiment, when the polyester film is immersed in a 0.5% to 3% aqueous solution of NaOH for 5 minutes to 30 minutes, the haze difference before and after the immersion may be 20% to 50%. For example, when the polyester film is immersed in a 1% aqueous solution of NaOH for 15 minutes, the haze difference before and after the immersion may be 20% to 40%, 25% to 40%, or 30% to 40%. If the above range is satisfied, the clumping fraction in the subsequent regeneration step can be reduced.

Specifically, when the polyester film is immersed in a 1% aqueous solution of NaOH for 15 minutes and if the haze difference before and after the immersion satisfies 20% to 50%, the melting point may be 140° C. or higher as measured by differential scanning calorimetry. For example, when the polyester film is immersed in a 1% aqueous solution of NaOH for 15 minutes and if the haze difference before and after the immersion is 20% to 40%, 25% to 40%, or 30% to 40%, the melting point may be 140° C. to 230° C., 145° C. to 200° C., or 150° C. to 200° C., as measured by differential scanning calorimetry.

According to an embodiment, the thickness of the polyester film may be 30 to 100 μm. For example, the thickness of the polyester film may be 30 to 95 μm or 35 to 90 μm. If the above range is satisfied, the shrinkage uniformity is excellent.

According to an embodiment, there is provided a polyester film, which comprises a first layer comprising a copolymerized polyester resin comprising a diol component and a dicarboxylic acid component and a second layer comprising a resin having a glass transition temperature (Tg) of 70° C. or higher.

First Layer

According to an embodiment, the first layer comprises a copolymerized polyester resin comprising a diol component and a dicarboxylic acid component.

Details on the copolymer polyester resin are as described above.

According to an embodiment, the thickness of the first layer may be 30 to 100 μm. For example, the thickness of the first layer may be 30 to 90 μm, 30 to 85 μm, 35 to 90 μm, or 40 to 80 μm.

Second Layer

According to an embodiment, the second layer comprises a resin having a glass transition temperature (Tg) of 70° C. or higher. For example, the second layer may comprise a resin having a glass transition temperature of 70° C. or higher, 75° C. or higher, 80° C. or higher, 70° C. to 350° C., 70° C. to 330° C., 70° C. to 300° C., 75° C. to 250° C., 75° C. to 200° C., 75° C. to 180° C., 75° C. to 150° C., or 75° C. to 120° C.

The second layer, which contains a resin that satisfies the glass transition temperature range, enhances the heat shrinkage rate of the polyester film and reduces the clumping fraction in the subsequent regeneration step.

According to an embodiment, the second layer may comprise at least one resin selected from the group consisting of polyethylene terephthalate (PET), polycyclohexylene dimethylene terephthalate (PCT), polymethylmethacrylate (PMMA), copolymerized polyethylene terephthalate (co-PET), polyethylene naphthalate (PEN), polyethersulfone (PES), polycarbonate (PC), polystyrene (PS), polyamide (PA), and polyimide (PI).

According to an embodiment, the thickness of the second layer may be 1 to 100 nm. For example, the thickness of the second layer may be 1 to 80 nm, 5 to 100 nm, 10 to 100 nm, 20 to 100 nm, 20 to 50 nm, 30 to 100 nm, 20 to 50 nm, 1 to 30 nm, 5 to 10 nm, 5 to 20 nm, or 1 to 20 nm.

According to an embodiment, the polyester film may be composed of 2 to 100 layers by laminating the first layer and the second layer. For example, the polyester film may be composed of 2 to 100 layers, 3 to 100 layers, 4 to 100 layers, 5 to 100 layers, 2 to 80 layers, 2 to 50 layers, 3 to 80 layers, 3 to 50 layers, 3 to 40 layers, or 3 to layers by alternately laminating the first layer and the second layer. Specifically, at least one of the outermost layers of the polyester film is composed of the second layer, which is advantageous in that it is possible to reduce the clumping fraction in the subsequent regeneration step.

According to an embodiment, the polyester film may be composed of three layers by laminating the first layer and the second layer, wherein the second layer may be located in the outermost layers. For example, the polyester film may be composed 3 to 80 layers, 3 to 50 layers, 3 to 40 layers, or 3 to 30 layers by alternately laminating the first layer and the second layer, wherein at least one of the outermost layers of the polyester film is the second layer. Specifically, the second layer, which comprises a resin having a glass transition temperature (Tg) of 70° C. or higher, is located in the outermost layers of the polyester film, which is advantageous in that it is possible to reduce the clumping fraction in the subsequent regeneration step.

According to an embodiment, the polyester film, which comprises the first layer and the second layer, may have a melting point (Tm) of 150° C. or higher as measured by differential scanning calorimetry. For example, the melting point of the polyester film may be 155° C. or higher, 160° C. or higher, 165° C. or higher, specifically 150° C. to 230° C., 155° C. to 200° C., 160° C. to 200° C., 165° C. to 200° C., or 165° C. to 180° C., as measured by differential scanning calorimetry. If the above range is satisfied, the clumping fraction in the subsequent regeneration step can be reduced.

Process for Preparing a Polyester Film (1)

A polyester film may be prepared from the copolymerized polyester resin.

Specifically, the copolymerized polyester resin may be melt-extruded at 260° C. to 300° C. or 270° C. to 290° through a T-die and then cooled to obtain an unstretched sheet. The unstretched sheet is passed through rolls while it is conveyed at a speed of m/min to 110 m/min or 50 m/min to 90 m/min, preheated, and then stretched to obtain a stretched sheet, which is heat set to prepare a polyester film.

The preheating may be carried out at 90° C. to 120° C. for 0.01 to 1 minute. For example, the preheating temperature (T1) may be 95° C. to 115° C. or 97° C. to 113° C., and the preheating time may be 0.05 minute to 0.5 minute or 0.08 minute to 0.2 minute. But they are not limited thereto.

According to an embodiment, the stretching may be carried out in a first direction or in a second direction perpendicular to the first direction. Alternatively, the stretching may be carried out in a first direction and then in a second direction. Specifically, the stretching may be carried out at a temperature lower than the preheating temperature (T1) by at least 20° C. in a first direction or in a second direction perpendicular to the first direction by 3 to 5 times. For example, the stretching may be carried out at a stretching temperature of 60° C. to 90° C., 70° C. to 90° C., or 80° C. to 90° C., in a first direction or in a second direction perpendicular to the first direction by 3 to 4.5 times, 3.5 to 4.5 times, or 4 to 4.5 times. But it is not limited thereto.

The heat setting may be annealing and carried out at 70° C. to 95° C. for 0.01 minute to 1 minute. For example, the heat setting temperature (T2) may be 75° C. to 95° C., 75° C. to 90° C., 80° C. to 90° C., 85° C. to 95° C., or 85° C. to 90° C., and the heat setting time may be 0.05 minute to 0.5 minute or 0.08 minute to 0.2 minute. But they are not limited thereto.

According to an embodiment, the preheating temperature (T1)–the heat setting temperature (T2) may be 10° C. to 40° C. For example, T1–T2 may be 13° C. to 35° C., 11° C. to 34° C., 15° C. to 34° C., or 20° C. to 34° C. If the above range is satisfied, the heat shrinkage rates in the first direction and in the second direction may be effectively controlled.

Process for Preparing a Polyester Film (2)

A polyester film may be prepared from the copolymerized polyester resin and a resin having a glass transition temperature (Tg) of 70° C. or higher.

Specifically, the process may comprise (a) preparing a sheet in which a first layer and a second layer are laminated from the copolymerized polyester resin and a resin having a glass transition temperature (Tg) of 70° C. or higher; (b) stretching the laminated sheet in at least one of a first direction and a second direction perpendicular to the first direction; (c) heat setting the stretched sheet; and (d) relaxing the heat-set sheet.

Step (a)

According to an embodiment, a sheet in which a first layer and a second layer are laminated may be prepared. Specifically, the copolymerized polyester resin and a resin having a glass transition temperature (Tg) of 70° C. or higher may be melt-extruded through an extruder, or the copolymerized polyester resin is melt-extruded and then a resin having a glass transition temperature (Tg) of 70° C. or higher is coated thereon, which is then dried to prepare a sheet in which a first layer and a second layer are alternately laminated. More specifically, the sheet prepared in the step (a) may be prepared by co-extruding the copolymerized polyester resin and a resin having a glass transition temperature (Tg) of 70° C. or higher, or extruding the copolymerized polyester resin, which is then subjected to a coating step to prepare a sheet in which a first layer and a second layer are laminated. The co-extrusion or coating step may be carried out by a conventional step.

According to an embodiment, the formation and lamination of the first layer and the second layer may be carried out simultaneously through co-extrusion.

According to an embodiment, the sheet prepared in the step (a) may be one in which the first layer and the second layer are alternately laminated. In addition, the outermost layers of the sheet prepared in the step (a) may be the second layer.

The melt-extrusion may be carried out at a temperature of 260° C. to 300° C. or 270° C. to 290° C. The melt-extruded copolymerized polyester resin and the resin having a glass transition temperature (Tg) of 70° C. or higher may be laminated through a multilayer feed block to form a sheet. Alternatively, the copolymerized polyester resin and the resin having a glass transition temperature (Tg) of 70° C. or higher may be extruded through two extruders, respectively, to a plurality of layers, which, as laminated, is then led to a T-die to form a sheet.

Step (b)

According to an embodiment, in the step (b), a step of stretching the sheet may be carried out in at least one of a first direction or a second direction perpendicular to the first direction.

Specifically, the sheet may be preheated at 90° C. to 140° C. for 0.01 minute to 1 minute before the stretching. For example, the preheating temperature (T1) may be 95° C. to 115° C. or 97° C. to 113° C., and the preheating time may be 0.05 minute to 0.5 minute or 0.08 minute to 0.2 minute. But they are not limited thereto.

The stretching may be carried out by biaxial stretching. For example, it may be carried out in a first direction and in a second direction through a simultaneous biaxial stretching method or a sequential biaxial stretching method. Preferably, it may be carried out by a sequential biaxial stretching method in which stretching is first performed in one direction and then stretching is performed in the direction perpendicular thereto. For example, the sheet may be stretched in a first direction and then stretched in a second direction.

According to an embodiment, the stretching may be carried out in a first direction or in a second direction perpendicular to the first direction. Alternatively, the stretching may be carried out in a first direction and then in a second direction. Specifically, the stretching may be carried out at a temperature lower than the preheating temperature (T1) by at least 20° C. in a first direction or in a second direction perpendicular to the first direction by 3 to 5 times. For example, the stretching may be carried out at a stretching temperature of 60° C. to 120° C., 60° C. to 90° C., 70° C. to 90° C., or 80° C. to 90° C., in a first direction or in a second direction perpendicular to the first direction by 3 to 4.5 times, 3.5 to 4.5 times, or 4 to 4.5 times. But it is not limited thereto.

Step (c)

According to an embodiment, in the step (c), the stretched sheet may be heat set.

Specifically, the heat setting may be annealing and carried out at 70° C. to 95° C. for 0.01 minute to 1 minute. For example, the heat setting temperature (T2) may be 75° C. to 95° C. or 75° C. to 90° C., and the heat setting time may be 0.05 minute to 0.5 minute or 0.08 minute to 0.2 minute. But they are not limited thereto.

According to an embodiment, the preheating temperature (T1)–the heat setting temperature (T2) may be 10° C. to 50° C. For example, T1–T2 may be 13° C. to 35° C., 10° C. to 34° C., 15° C. to 34° C., 10° C. to 46° C., or 20° C. to 46° C. If the above range is satisfied, the heat shrinkage rates in the first direction and in the second direction may be effectively controlled.

Step (d)

According to an embodiment, in the step (d), the heat-set sheet may be relaxed. Specifically, the heat-set sheet may be relaxed in a first direction or in a second direction perpendicular to the first direction.

The relaxation may be carried out at a relaxation rate of 0.1% to 10%, 0.5% to 8%, 1% to 5%, or 1% to 3%. In addition, the relaxation may be carried out for 1 second to 1 minute, 2 seconds to 30 seconds, or 3 seconds to 10 seconds.

Process for Regenerating a Polyester Container

According to an embodiment, there is provided a process for regenerating a polyester container, which comprises preparing the polyester container provided with the polyester film; crushing the container provided with the polyester film to obtain flakes; and thermally treating the flakes to produce regenerated polyester chips, wherein when the flakes are thermally treated at a temperature of 200° C. to 220° C. for 60 minutes to 120 minutes, the clumping fraction is 8% or less, and the flakes comprise first flakes obtained by crushing the container and second flakes obtained by crushing the polyester film.

Figure 1:
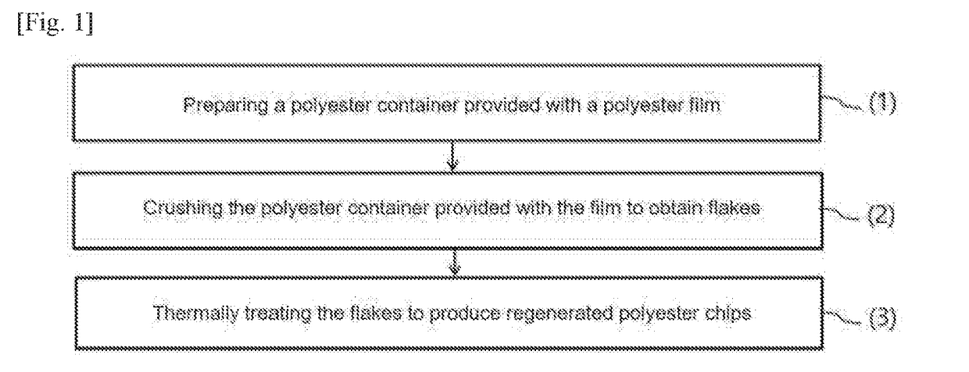
FIG. 1 schematically depicts a process for regenerating a polyester container according to an embodiment.
Figure 2:
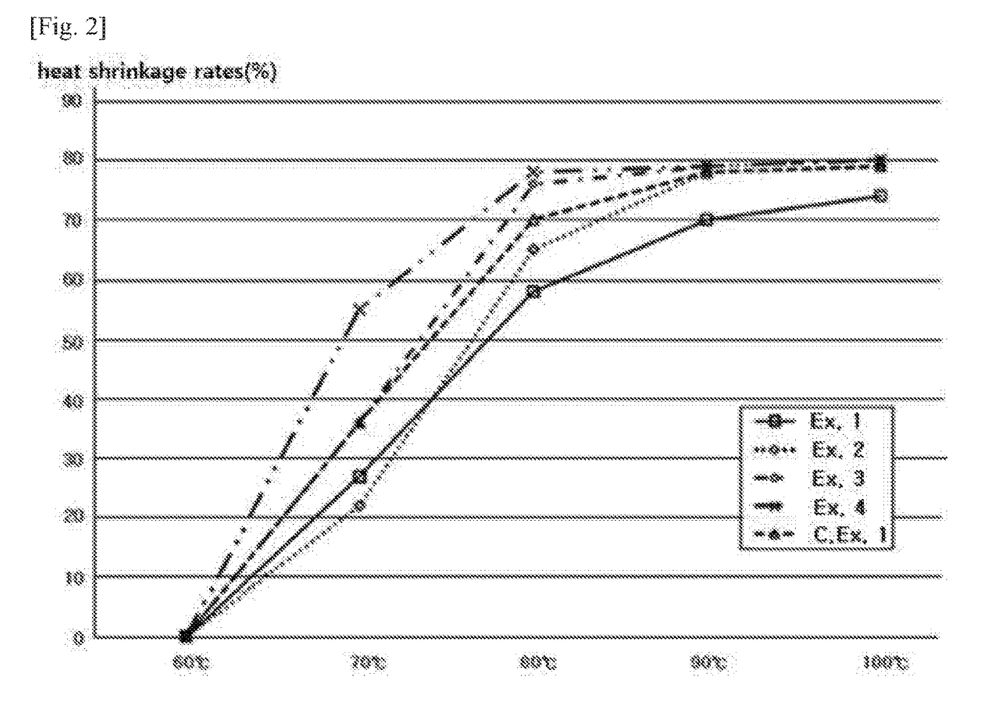
FIG. 2 shows the heat shrinkage rates of the polyester films of Examples 1-1 to 1-4 and Comparative Example 1-1.

FIG. 1 schematically depicts a process for regenerating a polyester container according to an embodiment. Specifically, FIG. 1 illustrates (1) preparing a polyester container provided with a polyester film; (2) crushing the container provided with the polyester film to obtain flakes; and (3) thermally treating the flakes to produce regenerated polyester chips.

Step (1)

In the step (1), a polyester container provided with a polyester film is prepared. Specifically, in the step (1), a waste polyester container provided with a polyester film is prepared.

Details on the polyester film are as described above.

In the polyester container provided with a polyester film, the polyester film may be provided on the outer surface of the polyester container. Specifically, the outer surface of the container is covered with the polyester film, and the polyester film may be shrunk by steam or hot air to wrap the outer surface of the container. In such event, the polyester film may have an ink layer formed by a process such as printing before the heat shrinkage.

According to an embodiment, the second layer of the polyester film provided in the polyester container may be in contact with the polyester container. For example, when the polyester film is a laminated film of the first layer and the second layer, the second layer may be in contact with the polyester container. If the second layer of the polyester film is in contact with the polyester container, it is possible to reduce the clumping fraction in the subsequent regeneration step.

In general, recycled waste products are intermingled with containers, metals, glass, and plastics. Once the waste products have been washed, polyester containers are classified. Then, the container may be subject to a process in which the film covering the container is mechanically torn or cut to be removed. Alternatively, once a container has been washed and crushed, it is then subjected to liquid specific gravity separation, dehydration, drying, and/or wind specific gravity separation, and then to such an additional step as pelletization. In such event, the quality of the regenerated polyester chips to be produced may be deteriorated due to the residual films and the ink layer formed on the residual films.

In contrast, it is possible to produce regenerated polyester chips from a container provided with a polyester film according to the embodiment even without an additional process of removing a film. Thus, time and cost are saved.

According to an embodiment, the polyester container may comprise at least 90% by weight of a polyester resin based on the total weight of the polyester container. Specifically, the polyester container may be a container that comprises polyethylene terephthalate and may comprise polyethylene terephthalate in an amount of 90% by weight or more, 95% by weight or more, or 99% by weight or more, based on the total weight of the polyester container.

According to an embodiment, the process may comprise immersing the polyester container provided with the film in a 0.5% to 3% aqueous solution of NaOH for 5 minutes to 30 minutes. For example, the process may comprise immersing the polyester container provided with the film in a 0.5% to 2.5% or 1% to 0.5% aqueous solution of NaOH for 5 minutes to 25 minutes or 10 minutes to 20 minutes.

Step (2)

In the step (2), the polyester container provided with the polyester film is crushed to obtain flakes. The polyester container prepared in the step (1) comprises the polyester film, which may be crushed to obtain flakes. In such event, the flakes comprise first flakes obtained by crushing the polyester container and second flakes obtained by crushing the polyester film.

According to an embodiment, the particle size of the first flakes may be 0.1 to 20 mm, and the particle size of the second flakes may be 0.1 to 20 mm. For example, the particle size of the first flakes may be 0.5 to 15 mm, 1 to 15 mm, or 2 to 10 mm, and the particle size of the second flakes may be 0.5 to 15 mm, 1 to 15 mm, or 2 to 10 mm.

Step (3)

In the step (3), the flakes are thermally treated to produce regenerated polyester chips.

The thermal treatment may be carried out at 200° C. to 220° C. for 60 minutes to 120 minutes. For example, the thermal treatment may be carried out at 200° C. to 215° C. or 205° C. to 220° C. for 70 minutes to 120 minutes or 80 minutes to 120 minutes.

Regenerated polyester chips that comprise the flakes may be obtained after the thermal treatment step. Specifically, regenerated polyester chips that comprise the first flakes and the second flakes may be obtained. For example, the flakes may be melt-extruded and cut to obtain regenerated polyester chips.

According to an embodiment, the flakes may be washed before the thermal treatment thereof. For example, the flakes may be washed with a 0.5% to 3% aqueous solution of NaOH at 80° C. to 97° C. for 5 minutes to 30 minutes. A part or all of the ink layer remaining in the flakes may be removed by carrying out the washing.

According to an embodiment, the flakes may be dried at 60° C. to 175° C. for 10 minutes to 30 minutes after the washing step.

Regenerated Polyester Chips

According to an embodiment, the regenerated polyester chips may comprise first flakes comprising polyethylene terephthalate and second flakes comprising a copolymerized polyester resin.

According to an embodiment, the regenerated polyester chips may have an intrinsic viscosity (IV) of 0.60 dl/g or more. For example, the regenerated polyester chips may have an intrinsic viscosity (IV) of 0.63 dl/g or more, 0.65 dl/g or more, 0.70 dl/g or more, 0.75 dl/g or more, 0.60 to 3.00 dl/g, 0.60 to 2.0 dl/g, or 0.65 to 1.0 dl/g.

According to an embodiment, when the flakes are thermally treated at a temperature of 200° C. to 220° C. for 60 minutes to 120 minutes, the clumping fraction may be 8% or less. More specifically, when the flakes are thermally treated at a temperature of 210° C. for 90 minutes, the clumping fraction may be 8% or less, 6% or less, 5% or less, 4% or less, 3% or less, 2% or less, 0.1% to 8%, 0.5% to 6%, or 1% to 6%. For example, when the flakes are thermally treated at a temperature of 200° C. to 220° C. for 60 minutes to 120 minutes, the clumping fraction may be 8% or less, 6% or less, 5% or less, 4% or less, 3% or less, 2% or less, 0.1% to 8%, 0.5% to 6%, 1% to 6%, or 1% to 5%.

The clumping refers to an aggregate that may be formed from the flakes. The size of the aggregate may be, for example, at least three times the size of the flake particle. The clumping fraction refers to the fraction of aggregates based on the total weight of the flakes. For example, the flakes may be passed through a sieve and thermally treated. At that time, aggregates may be formed as the flakes are clumped. The aggregates may be passed through a sieve again to be separated. The weight of the aggregates thus obtained is a measured to calculate the weight ratio of the aggregates based on the total weight of the thermally treated flakes as the clumping fraction.

Thus, the higher the value of the crumbling fraction is, the more the first flakes and the second flakes are entangled together to lower the quality of the regenerated chips. However, the second flakes are obtained by crushing the polyester film according to the embodiment, thereby effectively reducing or preventing the clumping phenomenon and enhancing the quality of the regenerated polyester chips.

According to an embodiment, the regenerated polyester chips may comprise 70 to 99% by weight of polyethylene terephthalate and 1 to 30% by weight of a copolymerized polyester resin based on the total weight of regenerated polyester chips. For example, the regenerated polyester chips may comprise 80 to 99% by weight, 90 to 99% by weight, or 95 to 99% by weight of polyethylene terephthalate and 1 to 28% by weight or 3 to 25% by weight of a copolymerized polyester resin based on the total weight of the regenerated polyester chips.

Details on the copolymer polyester resin are as described above.

MODE FOR THE INVENTION

Hereinafter, the present invention will be described in more detail with reference to the following examples. However, these examples are set forth to illustrate the present invention, and the scope of the present invention is not limited thereto.

Example 1-11

<Preparation of a Copolymerized Polyester Resin>

A stainless steel autoclave equipped with a stirrer, a thermometer, and a partial reflux condenser was charged with 100% by mole of dimethylterephthalate (DMT), 80% by mole of ethylene glycol (EG), 15% by mole of neopentyl glycol (NPG), and 5% by mole of diethylene glycol (DEG). Then, 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a copolymerized polyester resin.

<Preparation of a Polyester Film>

The copolymerized polyester resin was fed to an extruder and then melt-extruded at 280° C. through a T-die. Thereafter, it was wound around a rotating metal roll whose surface temperature was cooled to 30° C. to obtain an unstretched film having a thickness of 204 μm. Here, the take-up speed (rotation speed of the metal roll) of the unstretched film was 54 m/min.

The unstretched film was continuously wound around a plurality of rotating rolls to be preheated. The longitudinally stretched film was stretched 5 times in the transverse direction at 96° C. Thereafter, the film was heat set in the transverse direction while it was heated to 81° C. using an infrared heater to obtain a polyester film having a thickness of 41 μm.

<Preparation of a Polyester Container Provided with a Polyester Film>

The outer surface of a polyethylene terephthalate container (PET container, 30 g) was wrapped with the polyester film (1 g) prepared above. The polyester film was shrunk in hot air at a temperature of 90° C. to obtain a polyester container provided with a polyester film.

<Process for Regenerating a Polyester Container>

The container provided with the polyester film was crushed with a crusher to obtain flakes. The flakes were washed with water and then washed for 15 minutes with a corrosion washing solution (a mixture of a solution of 0.3% by weight of Triton X-100 and a solution of 1.0% by weight of NaOH) stirred in a bath at 85° C. to 90° C. at 880 rpm.

Thereafter, the flakes were washed with water at room temperature to remove the residual corrosion washing solution, dried at 160° C. for 20 minutes, and then thermally treated at 210° C. to produce regenerated polyester chips.

Examples 1-2 to 1-4 and Comparative Example 1-1

Regenerated polyester chips were prepared in the same manner as in Example 1-1, except that the components, contents, and heat-setting temperature were changed as shown in Table 1 below.

TABLE 1

| | DMT (% by mole) | EG (% by mole) | NPG (% by mole) | DEG (% by mole) | CHDM (% by mole) | Stretching temperature in the transverse direction (° C.) | Heat-setting temperature (° C.) |
|---|---|---|---|---|---|---|---|
| Ex. 1-1 | 100 | 80 | 15 | 5 | — | 96 | 81 |
| Ex. 1-2 | 100 | 70 | 25 | 5 | — | 96 | 81 |
| Ex. 1-3 | 100 | 70 | 25 | 5 | — | 96 | 78 |
| Ex. 1-4 | 100 | 70 | 25 | 5 | — | 96 | 75 |
| C. Ex. 1-1 | 100 | 70 | — | 5 | 25 | 96 | 81 |

* CHDM: cyclohexanedimethanol

Examples 2-1 to 2-4 and Comparative Examples 2-11

Regenerated polyester chips were prepared in the same manner as in Example 1-1, except that the components, contents, and heat-setting temperature were changed as shown in Table 2 below.

TABLE 2

| | DMT (% by mole) | EG (% by mole) | NPG (% by mole) | DEG (% by mole) | CHDM (% by mole) | Stretching temperature in the transverse direction (° C.) | Heat-setting temperature (° C.) |
|---|---|---|---|---|---|---|---|
| Ex. 2-1 | 100 | 80 | 15 | 5 | — | 96 | 81 |
| Ex. 2-2 | 100 | 75 | 20 | 5 | — | 96 | 81 |
| Ex. 2-3 | 100 | 70 | 25 | 5 | — | 96 | 81 |
| Ex. 2-4 | 100 | 70 | 30 | 5 | — | 96 | 81 |
| C. Ex. 2-1 | 100 | 70 | — | 5 | 25 | 96 | 81 |

Example 3-11

<Preparation of a Copolymerized Polyester Resin>

A stainless steel autoclave equipped with a stirrer, a thermometer, and a partial reflux condenser was charged with 100% by mole of terephthalic acid (TA) as a dicarboxylic acid component and 80% by mole of ethylene glycol (EG), 17% by mole of neopentyl glycol (NPG), and 5% by mole of diethylene glycol (DEG) as a diol component. Then, 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a copolymerized polyester resin.

<Preparation of a Polyester Film>

The copolymerized polyester resin was fed to an extruder and then melt-extruded at 280° C. through a T-die. Thereafter, it was wound around a rotating metal roll whose surface temperature was cooled to 30° C. to obtain an unstretched film having a thickness of 204 μm. Here, the take-up speed (rotation speed of the metal roll) of the unstretched film was 54 m/min.

The unstretched film was continuously wound around a plurality of rotating rolls to be preheated at 100° C. to 110° C. for 0.1 minute. The longitudinally stretched film was stretched 5 times in the transverse direction at 75° C. Thereafter, the film was annealed in the second direction while it was heated to 85° C. using an infrared heater to obtain a polyester film having a thickness of 40 μm.

<Preparation of a Polyester Container Provided with a Polyester Film>

The outer surface of a polyethylene terephthalate container (PET container, 30 g) was wrapped with the polyester film (1 g) prepared above. The polyester film was shrunk in hot air at a temperature of 90° C. to obtain a polyester container provided with a polyester film.

<Process for Regenerating a Polyester Container>

The container provided with the polyester film was crushed with a crusher to obtain flakes. The flakes were washed with water and then washed for 15 minutes with a corrosion washing solution (a mixture of a solution of 0.3% by weight of Triton X-100 and a solution of 1.0% by weight of NaOH) stirred in a bath at 85° C. to 90° C. at 880 rpm.

Thereafter, the flakes were washed with water at room temperature to remove the residual corrosion washing solution, dried at 160° C. for 20 minutes, and then thermally treated at 210° C. to produce regenerated polyester chips.

Examples 3-2 to 3-5 and Comparative Example 3-1

Regenerated polyester chips were prepared in the same manner as in Example 3-1, except that the components, contents, and heat-setting temperature were changed as shown in Table 3 below.

TABLE 3

| | TA (% by mole) | EG (% by mole) | NPG (% by mole) | DEG (% by mole) | CHDM (% by mole) | Stretching temperature in the transverse direction (° C.) | Heat-setting temperature (° C.) |
|---|---|---|---|---|---|---|---|
| Ex. 3-1 | 100 | 80 | 17 | 5 | — | 75 | 85 |
| Ex. 3-2 | 100 | 75 | 20 | 5 | — | 76 | 85 |
| Ex. 3-3 | 100 | 70 | 25 | 5 | — | 76 | 83 |
| Ex. 3-4 | 100 | 68.5 | 30 | 1.5 | — | 77 | 85 |
| Ex. 3-5 | 100 | 73 | — | 10 | 17 | 75 | 86 |
| C. Ex. 3-1 | 100 | 68.5 | — | 1.5 | 30 | 76 | 84 |

Example 4-11

<Preparation of a Copolymerized Polyester Resin>

A stainless steel autoclave equipped with a stirrer, a thermometer, and a partial reflux condenser was charged with 100% by mole of terephthalic acid (TA) as a dicarboxylic acid component and 68.5% by mole of ethylene glycol (EG), 30% by mole of cyclohexanedimethanol (CHDM), and 1.5% by mole of diethylene glycol (DEG) as a diol component. Then, 0.05% by mole (based on the acid component) of zinc acetate as a transesterification catalyst was added thereto. The transesterification reaction was carried out while methanol was being distilled off. Thereafter, 0.025% by mole (based on the acid component) of antimony trioxide as a polycondensation catalyst was added, and the polycondensation reaction was carried out under a reduced pressure of 26.6 Pa (0.2 Torr) at 280° C. to obtain a copolymerized polyester resin.

<Preparation of a Polyester Film>

The copolymerized polyester resin was fed to an extruder, melt-extruded at 280° C. through a T-die, and then cooled. Polyethylene terephthalate (PET 1) having a glass transition temperature of 70° C. or higher was coated thereon to obtain an unstretched sheet. The unstretched sheet was preheated at 100° C. to 110° C. for 0.1 minute while it was conveyed at a speed of 55 m/min, stretched 3.0 times in the transverse direction at 75° C., and then heat set at 75° C. for 0.1 minute to obtain a polyester film having a thickness of 40 μm.

<Preparation of a Polyester Container Provided with a Polyester Film>

The outer surface of a polyethylene terephthalate container (PET container, 30 g) was wrapped with the polyester film (1 g) prepared above. The polyester film was shrunk in hot air at a temperature of 90° C. to obtain a polyester container provided with a polyester film. At that time, the second layer of the polyester film was brought into contact with the polyethylene terephthalate container.

<Process for Regenerating a Polyester Container>

The container provided with the polyester film was crushed with a crusher to obtain flakes. The flakes were washed with water and then washed for 15 minutes with a corrosion washing solution (a mixture of a solution of 0.3% by weight of Triton X-100 and a solution of 1.0% by weight of NaOH) stirred in a bath at 85° C. to 90° C. at 880 rpm.

Thereafter, the flakes were washed with water at room temperature to remove the residual corrosion washing solution, dried at 160° C. for 20 minutes, and then thermally treated at 210° C. to produce regenerated polyester chips.

Examples 4-2 to 4-8 and Comparative Examples 4-1 to 4-2

Regenerated polyester chips were prepared in the same manner as in Example 4-1, except that the components, contents, and heat-setting temperature were changed as shown in Table 4 below and that a copolymerized polyester resin and a resin having a glass transition temperature (Tg) of 70° C. or higher were co-extruded through two extruders and laminated in Examples 4-3, 4-4, 4-7, and 4-8.

Evaluation Example 1: Evaluation of Heat Shrinkage Rates

The polyester films prepared above (300 mm×15 mm) were immersed in a water bath preheated to 80° C., 90° C., or 100° C. for 10 seconds, respectively. After water was removed at room temperature, the heat shrinkage rate was calculated by the following equation.

Heat shrinkage rate (%)=[(length of film sample before thermal treatment (mm)−length of film sample upon thermal treatment (mm)/length of film sample before thermal treatment (mm)]×100

Evaluation Example 2: Evaluation of Tg, Tc, Tm, and Heat of Crystallization

The endotherm and exotherm of the polyester films (10 mg) prepared above were each measured with Differential Scanning Calorimetry-Mettler Toledo DSC 1 while the temperature was raised at a rate of 10° C./min from 30° C. to 250° C. The first endothermic temperature was a glass transition temperature (Tg), the exothermic temperature measured after the Tg was a crystallization temperature (Tc), and the endothermic temperature measured after the Tc was a melting point (Tm) in the measurement result. The integral at Tc was calculated as the heat of crystallization. The larger the value of the heat of crystallization, the faster the crystallization rate and the higher the transfer rate to a crystalline phase.

Evaluation Example 3: Evaluation of Clumping

The flakes prepared above were passed through a 0.625"-sieve. 1 kg of the flakes thus sieved was exposed in an oven at 210° C. for 90 minutes. They were cooled to room temperature and passed through a 625"-sieve. The weight of the aggregates thus filtered was measured and calculated as a percentage of the total weight of the flakes.

TABLE 4

| | No. of laminations | 1st layer | | | | | 2nd layer | Stretching temperature in the transverse direction (° C.) | Heat-setting temperature (° C.) |
| | | TA (% by mole) | EG (% by mole) | NPG (% by mole) | DEG (% by mole) | CHDM (% by mole) | | | |
|---|---|---|---|---|---|---|---|---|---|
| Ex. 4-1 | 2 layers | 100 | 68.5 | — | 1.5 | 30 | PET 1 | 85 | 75 |
| Ex. 4-2 | | 100 | 65 | 30 | 5 | — | PET 2 | 84 | 74 |
| Ex. 4-3 | | 100 | 68.5 | — | 1.5 | 30 | PCT | 85 | 75 |
| Ex. 4-4 | | 100 | 65 | 30 | 5 | — | PEN | 84 | 74 |
| Ex. 4-5 | 3 layers | 100 | 68.5 | — | 1.5 | 30 | PET 1 | 85 | 75 |
| Ex. 4-6 | | 100 | 65 | 30 | 5 | — | PET 2 | 84 | 74 |
| Ex. 4-7 | | 100 | 68.5 | — | 1.5 | 30 | PCT | 96 | 75 |
| Ex. 4-8 | | 100 | 65 | 30 | 5 | — | PEN | 120 | 74 |
| C. Ex. 4-1 | Single layer | 100 | 68.5 | — | 1.5 | 30 | — | 85 | 75 |
| C. Ex. 4-2 | Single layer | 100 | 65 | 30 | 5 | — | — | 84 | 74 |

*NPG: neopentyl glycol
*PET 1: polyethylene terephthalate (Goo Chemical, Z687) (glass transition temperature (Tg): 100° C.)
*PET 2: polyethylene terephthalate (Goo Chemical, Z690) (glass transition temperature (Tg): 110° C.)
*PCT: polycyclohexylenedimethylene terephthalate (glass transition temperature (Tg): 96° C.)
*PEN: polyethylene naphthalate (glass transition temperature (Tg): 120° C.)
* Lamination structure of two layers: second layer/first layer
* Lamination structure of three layers: second layer/first layer/second layer Evaluation Example 4: Evaluation of Intrinsic Viscosity The regenerated polyester chips prepared above were dissolved in ortho-chlorophenol at 100° C., and the intrinsic viscosity (IV) was measured with an Ostwald viscometer at 35° C. in a thermostatic bath by measuring the time for the sample to drop.

Evaluation Example 5: Evaluation of Haze

The films prepared above were each immersed in a 1% aqueous solution of NaOH at 85° C. for 15 minutes. The hazes before and after the immersion were measured with a haze meter (model name: SEP-H) from Nihon Semitsu Kogaku (Japan) using a C-light source.

TABLE 5

| | Heat shrinkage rate in transverse direction (80° C.) | Heat shrinkage rate in transverse direction (90° C.) | Tc (° C.) | Tm (° C.) | Heat of crystallization (J/g) | Clumping (%) | Intrinsic viscosity (dl/g) |
|---|---|---|---|---|---|---|---|
| Ex. 1-1 | 58% | 70% | — | 199 | — | 0.02 | 0.76 |
| Ex. 1-2 | 65% | 78% | — | 171 | — | 1.3 | 0.78 |
| Ex. 1-3 | 62% | 79% | 90 | 171 | 0.3 | 0.5 | 0.79 |
| Ex. 1-4 | 67% | 79% | 78 | — | 1.2 | 0 | 0.76 |
| C. Ex. 1-1 | 68% | 78% | 82 | 166 | 0.1 | 9.7 | 0.76 |

TABLE 6

| | Heat shrinkage rate in transverse direction (80° C.) | Heat shrinkage rate in transverse direction (90° C.) | Tc (° C.) | Tm (° C.) | Heat of crystallization (J/g) | Clumping (%) | Intrinsic viscosity (dl/g) |
|---|---|---|---|---|---|---|---|
| Ex. 2-1 | 58% | 70% | — | 199 | — | 0.02 | 0.76 |
| Ex. 2-2 | 63% | 72% | — | 178 | — | 0.15 | 0.80 |
| Ex. 2-3 | 65% | 78% | — | 171 | 0.3 | 1.3 | 0.78 |
| Ex. 2-4 | 66% | 79% | — | 172 | 1.2 | 4.0 | 0.79 |
| C. Ex. 2-1 | 68% | 78% | 82 | 166 | 0.1 | 9.7 | 0.76 |

TABLE 7

| | Heat shrinkage rate in transverse direction (80° C.) | Heat shrinkage rate in transverse direction (90° C.) | Haze (%) Before | Haze (%) After | Tc (° C.) | Tm (° C.) | Clumping (%) | Intrinsic viscosity (dl/g) |
|---|---|---|---|---|---|---|---|---|
| Ex. 3-1 | 40% | 60% | 5 | 5 | — | 200 | 0.2 | 0.61 |
| Ex. 3-2 | 45% | 66% | 5 | 5 | — | 180 | 0.5 | 0.62 |
| Ex. 3-3 | 43% | 63% | 5 | 41 | 80 | 150 | 0.8 | 0.59 |
| Ex. 3-4 | 49% | 69% | 6 | 40 | 79 | 150 | 1 | 0.57 |
| Ex. 3-5 | 44% | 65% | 4 | 4 | — | 176 | 2 | 0.69 |
| C. Ex. 3-1 | 50% | 70% | 3 | 3 | — | 165 | 10 | 0.71 |

As shown in Tables 5 to 7, the polyester films prepared in the Examples and the regenerated polyester chips prepared by the process for regenerating a polyester container using the same each had a low clumping fraction and were excellent in all of the heat of crystallization and intrinsic viscosity characteristics.

TABLE 8

| | Heat shrinkage rate in transverse direction (100° C.) | Tc (° C.) | Tm (° C.) | Heat of Crystallization (J/g) | Clumping (%) | Intrinsic viscosity (dl/g) |
|---|---|---|---|---|---|---|
| Ex. 4-1 | 78% | — | 165 | — | 8 | 0.68 |
| Ex. 4-2 | 78% | — | 170 | — | 6 | 0.80 |
| Ex. 4-3 | 60% | — | 165 | — | 5 | 0.68 |
| Ex. 4-4 | 50% | — | 170 | — | 3 | 0.80 |
| Ex. 4-5 | 75% | — | 165 | — | 4 | 0.69 |
| Ex. 4-6 | 76% | — | 170 | — | 4 | 0.79 |
| Ex. 4-7 | 55% | — | 165 | — | 2 | 0.75 |
| Ex. 4-8 | 45% | — | 170 | — | 1 | 0.86 |
| C. Ex. 4-1 | 78% | — | 165 | — | 10 | 0.68 |
| C. Ex. 4-2 | 79% | — | 170 | — | 8 | 0.68 |

As shown in Table 8, the polyester films prepared in the Examples and the regenerated polyester chips prepared by the process for regenerating a polyester container using the same each had a low clumping fraction.

The invention claimed is:

1. A polyester film, which comprises a copolymerized polyester resin comprising a diol component and a dicarboxylic acid component and
   has a heat shrinkage rate of 30% or more in the main shrinkage direction upon thermal treatment at a temperature of 80° C. for 10 seconds and
   a melting point of 170° C. or higher as measured by differential scanning calorimetry.

2. The polyester film of claim 1, wherein the diol component is at least one selected from the group consisting of ethylene glycol, diethylene glycol, neopentyl glycol, and cyclohexanedimethanol.

3. The polyester film of claim 1, wherein the copolymerized polyester resin comprises ethylene glycol in an amount of 55 to 94% by mole and diethylene glycol in an amount of 1 to 20% by mole based on the total number of moles of the diol component.

4. The polyester film of claim 1, wherein the copolymerized polyester resin comprises neopentyl glycol in an amount of 5 to 35% by mole based on the total number of moles of the diol component.

5. The polyester film of claim 1, wherein the crystallization temperature of the polyester film is not measured or is 70° C. to 95° C. by differential scanning calorimetry.

6. The polyester film of claim 5, wherein the heat of crystallization of the polyester film at the crystallization temperature is not measured or is 0.01 to 50 J/g.

7. The polyester film of claim 1, which has a heat shrinkage rate of 30% or more in a first direction upon thermal treatment at a temperature of 100° C. for 10 seconds,
   a heat shrinkage rate of 50% or more in the first direction upon thermal treatment at a temperature of 90° C. for 10 seconds, and
   a heat shrinkage rate of 5% to 55% in the first direction upon thermal treatment at a temperature of 70° C. for 10 seconds.

8. The polyester film of claim 1, wherein the rate of increase in the heat shrinkage rate in a first direction in the temperature range of 0.35×Tm° C. to 0.40×Tm° C. is 2.5%/° C. to 4.0%/° C., and
   the rate of increase in the heat shrinkage rate in the first direction in the temperature range of 0.45×Tm° C. to 0.50×Tm° C. is 0.1%/° C. to 1.0%/° C.

9. A polyester film, which comprises a copolymerized polyester resin comprising a diol component and a dicarboxylic acid component and has a haze of 50% or less when immersed in a 1% aqueous solution of NaOH for 15 minutes.

10. A polyester film, which comprises a first layer comprising a copolymerized polyester resin comprising a diol component and a dicarboxylic acid component and a second layer comprising a resin having a glass transition temperature (Tg) of 70° C. or higher.

11. The polyester film of claim 10, wherein the second layer comprises at least one resin selected from the group consisting of polyethylene terephthalate (PET), polycyclohexylene dimethylene terephthalate (PCT), polymethylmethacrylate (PMMA), copolymerized polyethylene terephthalate (co-PET), polyethylene naphthalate (PEN), polyethersulfone (PES), polycarbonate (PC), polystyrene (PS), polyamide (PA), and polyimide (PI).

12. The polyester film of claim 10, wherein the thicknesses of the first layer and the second layer are 30 to 100 nm, respectively.

13. The polyester film of claim 10, which is composed of 2 to 100 layers by laminating the first layer and the second layer.

14. The polyester film of claim 10, which is composed 3 to 100 layers by laminating the first layer and the second layer, wherein the second layer is located in the outermost layers.

15. A process for regenerating a polyester container, which comprises preparing the polyester container provided with the polyester film according to claim 1;
   crushing the container provided with the polyester film to obtain flakes; and
   thermally treating the flakes to produce regenerated polyester chips,
   wherein when the flakes are thermally treated at a temperature of 200° C. to 220° C. for 60 minutes to 120 minutes, the clumping fraction is 8% or less, and
   the flakes comprise first flakes obtained by crushing the container and second flakes obtained by crushing the polyester film.

16. The process for regenerating a polyester container of claim 15, wherein the particle size of the first flakes is 0.1 to 20 mm, and the particle size of the second flakes is 0.1 to 20 mm.

17. The process for regenerating a polyester container of claim 15, wherein the container comprises polyethylene terephthalate in an amount of 90% by weight or more.

18. Regenerated polyester chips prepared according to the regeneration process of claim 15.

19. The regenerated polyester chips of claim 18, which comprise first flakes that comprise polyethylene terephthalate and second flakes that comprise a copolymerized polyester resin.

20. The regenerated polyester chips of claim 18, which have an intrinsic viscosity (IV) of 0.60 dl/g or more.

* * * * *